United States Patent
Hong

(10) Patent No.: US 8,532,373 B2
(45) Date of Patent: Sep. 10, 2013

(54) JOINT COLOR CHANNEL IMAGE NOISE FILTERING AND EDGE ENHANCEMENT IN THE BAYER DOMAIN

(75) Inventor: Wei Hong, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 129 days.

(21) Appl. No.: 13/289,469

(22) Filed: Nov. 4, 2011

(65) Prior Publication Data

US 2013/0114895 A1 May 9, 2013

(51) Int. Cl.
*G06K 9/00* (2006.01)
*G06K 9/40* (2006.01)

(52) U.S. Cl.
USPC ............ 382/162; 382/167; 382/254; 382/260

(58) Field of Classification Search
USPC ......................... 382/162, 167, 254, 260–266
See application file for complete search history.

(56) References Cited

U.S. PATENT DOCUMENTS

| | | | |
|---|---|---|---|
| 8,385,671 B1 * | 2/2013 | Batur | 382/254 |
| 2008/0285868 A1 | 11/2008 | Rai et al. | |
| 2009/0153739 A1 | 6/2009 | Hong | |
| 2010/0092082 A1 * | 4/2010 | Hirakawa et al. | 382/167 |
| 2011/0182510 A1 | 7/2011 | Hong | |
| 2011/0317916 A1 * | 12/2011 | Zhang et al. | 382/167 |

OTHER PUBLICATIONS

Hirakawa, K., Xiao-Li Meng; Wolfe, P.J."A Framework for wavelet-Based Analysis and Processing of Color Filter Array Images with Applications to Denoising and Demosaicing" ICASSP 2007.*
Lei Zhang, Lukac, R.; Xiaolin Wu; Zhang, D. "PCA-Based Spatially Adaptive Denoising of CFA Images for Single-Sensor Digital Cameras", IEEE Transactions on Image Processing, 2009.*
Menon, D., Calvagno, G. "Joint demosaicking and denoisingwith space-varying filters", ICIP 2009.*
Sung Hee Park, Hyung Suk Kim; Lansel, S.; Parmar, M.; Wandell, B.A. "A case for denoising before demosaicking color filter array data", Forty-Third Asilomar Conference on Signals, Systems and Computers, 2009.*
Yansun Xu et al, "Wavelet Transform Domain Filters: A Spatially Selective Noise Filtration Technique", IEEE Transactions on Image Processing, vol. 3, No. 6, Nov. 1994, pp. 747-758.
Robert Porter and Nishan Canagarajah, "A Robust Automatic Clustering Scheme for Image Segmentation Using Wavelets", IEEE Transactions on Image Processing, vol. 5, No. 4, Apr. 1996, pp. 662-665.
Jean-Luc Starck et al, "The Undecimated Wavelet Decomposition and its Reconstruction", IEEE Transactions on Image Processing, vol. 16, No. 2, Feb. 2007, pp. 297-309.
George Bebis, Wavelets (Chapter 7), CS474/674 Image Processing and Interpretation,University of Nevada, Reno, Nevada, Fall 2011, pp. 1-141.

* cited by examiner

*Primary Examiner* — Li Liu
(74) *Attorney, Agent, or Firm* — Mirna Abyad; W. James Brady; Frederick J. Telecky, Jr.

(57) ABSTRACT

A method for image noise filtering is provided that includes receiving a Bayer domain image with four color channels, generating a hierarchical representation of the four color channels comprising a set of coefficient arrays at each level of the hierarchical representation, modifying the coefficient arrays of the color channels jointly to remove noise, and generating a noise filtered and edge enhanced Bayer domain image based on the jointly modified coefficient arrays.

18 Claims, 3 Drawing Sheets

JOINT COLOR CHANNEL IMAGE NOISE FILTERING AND EDGE ENHANCEMENT IN THE BAYER DOMAIN

BACKGROUND OF THE INVENTION

1. Field of the Invention

Embodiments of the present invention generally relate to joint color channel image noise filtering and edge enhancement of digital images in the Bayer domain.

2. Description of the Related Art

Images (i.e., single photographs or frames/pictures in video sequences) captured by imaging sensors in digital cameras often contain large amounts of random noise that degrades image quality. Typically, one or more image noise filters are applied to the captured images at various points (e.g., in the Bayer domain and/or the YUV domain) during the processing of the images to reduce the noise and improve visual quality.

An image is processed by many components in an image pipe before it is converted to the YUV domain. These processing components may change the noise characteristics drastically, e.g., noise from one color channel may leak to another color channel, thus making noise removal much more difficult. A Bayer domain noise filter is applied to an image before processing by other components in the image pipe, i.e., before the processing by the other components possibly changes the noise characteristics in the image. Thus, application of noise filtering and edge enhancement in the Bayer domain may be better than application in the YUV domain. Further, if noise is removed in the Bayer domain, the performance of the other components in the image pipe may be more robust as they would receive less noisy and sharper inputs.

A Bayer domain noise filter is also more effective at removing low-frequency noise that a YUV domain filter. The width and height of the Bayer image in each color channel are just half of the width and height of the YUV image. If the same filter is applied in the Bayer domain and the YUV domain, the effective filter size in the Bayer domain is twice that of the filter size in YUV domain. The larger effective filter size in Bayer domain can thus remove noise with lower frequency.

SUMMARY

Embodiments of the present invention relate to a method and apparatus for joint color channel image noise filtering and edge enhancement in the Bayer domain. In one aspect, a method is provided that includes receiving a Bayer domain image with four color channels, generating a hierarchical representation of the four color channels comprising a set of coefficient arrays at each level of the hierarchical representation, modifying the coefficient arrays of the color channels jointly to remove noise, and generating a noise filtered and edge enhanced Bayer domain image based on the jointly modified coefficient arrays.

In one aspect, an apparatus is provided that includes means receiving a Bayer domain image with four color channels, means for generating a hierarchical representation of the four color channels comprising a set of coefficient arrays at each level of the hierarchical representation, means for modifying the coefficient arrays of the color channels jointly to remove noise, and means for generating a noise filtered and edge enhanced Bayer domain image based on the jointly modified coefficient arrays.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
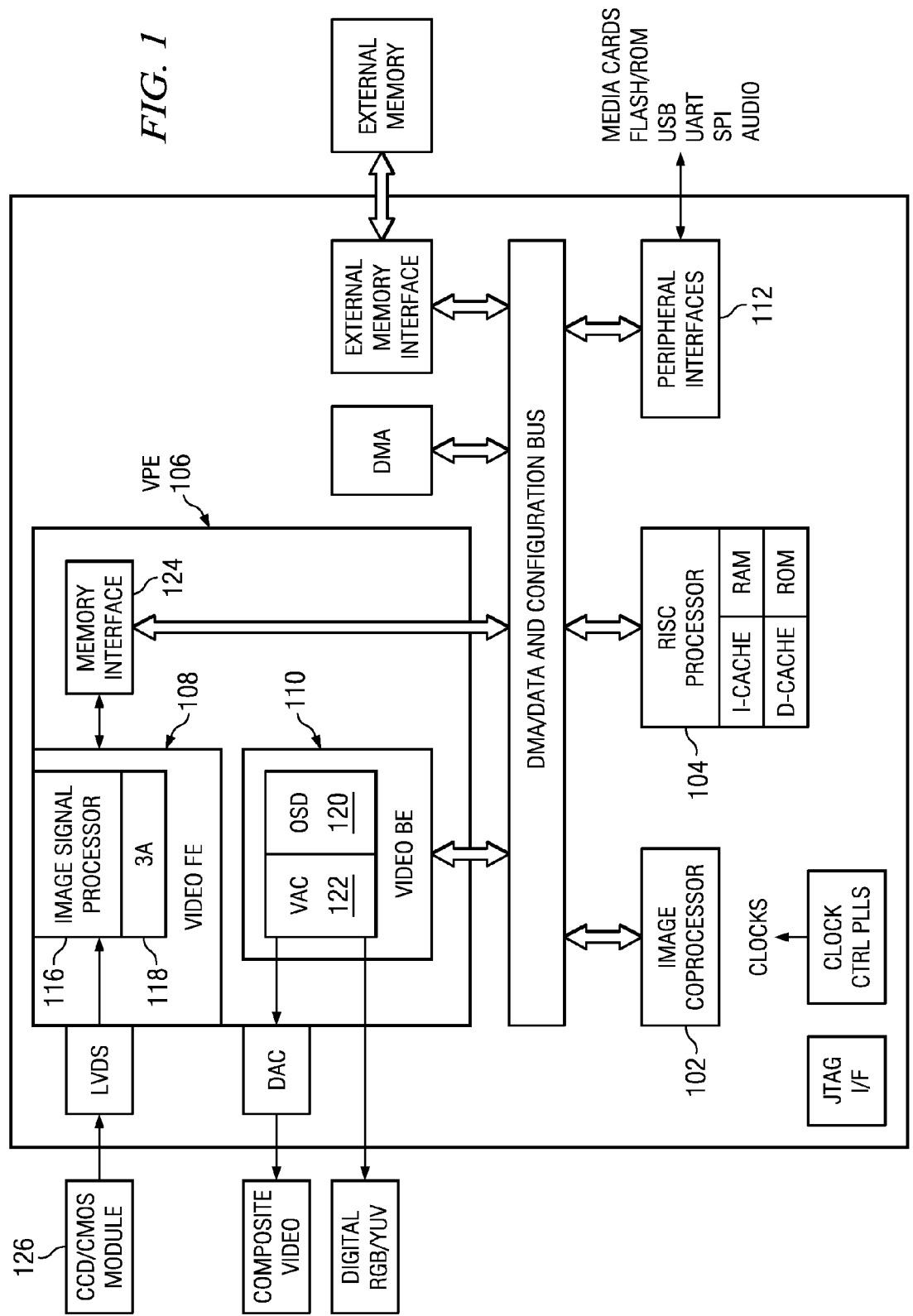
FIG. 1 is a block diagram of a digital system.

Specific embodiments of the invention will now be described in detail with reference to the accompanying figures. Like elements in the various figures are denoted by like reference numerals for consistency.

Embodiments of the invention provide joint color channel noise filtering and edge enhancement of digital images in the Bayer domain. There are many prior art noise filter and edge enhancement techniques that are performed in the Bayer domain. However, these prior art techniques operated on each color channel Gr, R, B, Gb independently and thus tend to destroy edges and fine textures, i.e., $$Gr'(x,y)=F\_Gr(Gr(x,y))$$

$$R'(x,y)=F\_R(R(x,y))$$

$$B'(x,y)=F\_B(B(x,y))$$

$$Gb'(x,y)=F\_Gb(Gb(x,y))$$

where F_Gr, F_R, F_B, and F_Gb are the respective filters for the color channels. The joint color channels noise filtering and edge enhancement described herein performs noise filtering and edge enhancement jointly in the Bayer domain on all four color channels Gr, R, B, Gb, i.e., $$\{Gr'(x,y),R'(x,y),B'(x,y),Gb'(x,y)\}= F(\{Gr(x,y),R(x,y),B(x,y),Gb(x,y)\}).$$

The joint filtering of the color channels preserves edges and fine textures better than applying four independent color channel filters. Further, the computational complexity of applying the joint filter is lower than applying four independent filters.

FIG. 1 shows an illustrative digital system suitable for use in an embedded system, e.g., in a digital camera or a cellular telephone. The digital system includes, among other components, an image coprocessor (ICP) 102, a RISC processor 104, and a video processing engine (VPE) 106 that may be configured to perform an image noise filtering method as described herein. The RISC processor 104 may be any suitably configured RISC processor.

The VPE 106 includes a configurable video processing front-end (Video FE) 108 input interface used for video capture from imaging peripherals such as image sensors, video decoders, etc., a configurable video processing back-end (Video BE) 110 output interface used for display devices such as SDTV displays, digital LCD panels, HDTV video encoders, etc, and memory interface 124 shared by the Video FE 108 and the Video BE 110. The digital system also includes peripheral interfaces 112 for various peripherals that may include a multi-media card, an audio serial port, a Universal Serial Bus (USB) controller, a serial port interface, etc.

The Video FE 108 includes an image signal processor (ISP) 116, and a 3A statistic generator (3A) 118. The ISP 116 provides an interface to image sensors and digital video sources. More specifically, the ISP 116 may accept raw image/video data from a sensor module 126 (e.g., CMOS or CCD) and can accept YUV video data in numerous formats. The ISP 116 also includes a parameterized image processing module with functionality to generate image data in a color format (e.g., RGB) from raw CCD/CMOS data. The ISP 116 is customizable for each sensor type and supports video frame rates for preview displays of captured digital images and for video recording modes. The ISP 116 also includes, among other functionality, an image resizer, statistics collection functionality, and a boundary signal calculator. The 3A module 118 includes functionality to support control loops for auto focus, auto white balance, and auto exposure by collecting metrics on the raw image data from the ISP 116 or external memory. The Video FE 108 may be configured to perform a method for image noise filtering as described herein.

The Video BE 110 includes an on-screen display engine (OSD) 120 and a video analog encoder (VAC) 122. The OSD engine 120 includes functionality to manage display data in various formats for several different types of hardware display windows and it also handles gathering and blending of video data and display/bitmap data into a single display window before providing the data to the VAC 122 in a color space format (e.g., RGB, YUV, YCbCr). The VAC 122 includes functionality to take the display frame from the OSD engine 120 and format it into the desired output format and output signals required to interface to display devices. The VAC 122 may interface to composite NTSC/PAL video devices, S-Video devices, digital LCD devices, high-definition video encoders, DVI/HDMI devices, etc.

The memory interface 124 functions as the primary source and sink to modules in the Video FE 108 and the Video BE 110 that are requesting and/or transferring data to/from external memory. The memory interface 124 includes read and write buffers and arbitration logic.

The ICP 102 may be, for example, a digital signal processor (DSP) or other processor designed to accelerate image processing. The ICP 102 includes functionality to perform the computational operations required for compression and other processing of captured images. The video compression standards supported may include, for example, one or more of the JPEG standards, the MPEG standards, and the H.26x standards. In one or more embodiments of the invention, the ICP 102 may be configured to perform computational operations of a method for image noise filtering as described herein.

In operation, to capture a photograph or video sequence, video signals are received by the video FE 108 and converted to the input format needed to perform video compression. Prior to the compression, a method for image noise filtering as described herein may be applied as part of processing the captured video data. The video data generated by the video FE 108 is stored in the external memory. The video data is then encoded, i.e., compressed. During the compression process, the video data is read from the external memory and the compression computations on this video data are performed by the ICP 102. The resulting compressed video data is stored in the external memory. The compressed video data is then read from the external memory, decoded, and post-processed by the video BE 110 to display the image/video sequence.

Figure 2:
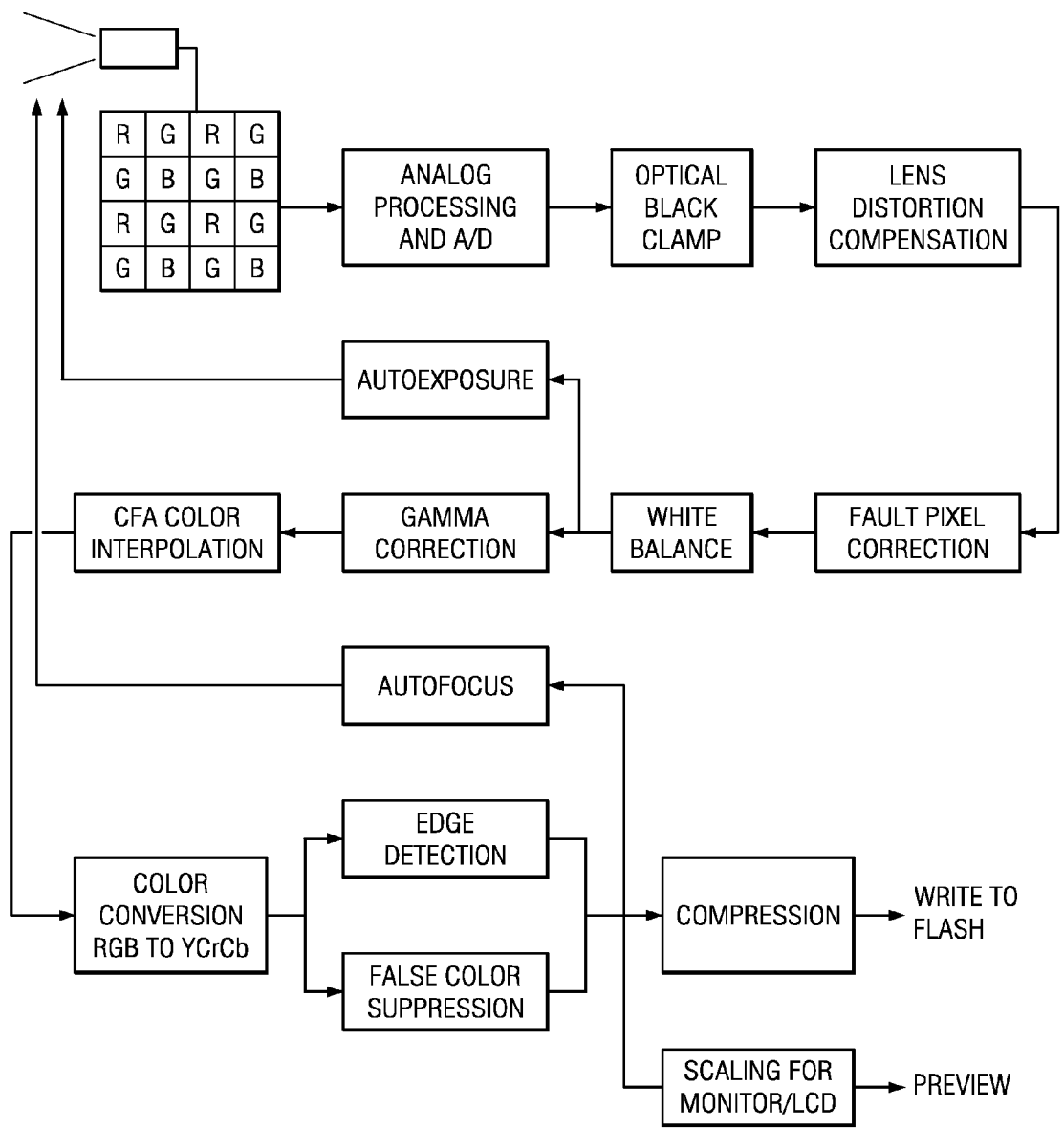
FIG. 2 is a block diagram of an image processing pipeline.

FIG. 2 is a block diagram illustrating digital camera control and image processing (the "image pipeline"). One of ordinary skill in the art will understand that similar functionality may also be present in other digital systems (e.g., a cell phone, PDA, a desktop or laptop computer, etc.) capable of capturing digital images, i.e., digital photographs and/or digital video sequences. The automatic focus, automatic exposure, and automatic white balancing are referred to as the 3A functions; and the image processing includes functions such as color filter array (CFA) interpolation, gamma correction, white balancing, color space conversion, and compression/decompression (e.g., JPEG for single photographs and MPEG for video sequences). A brief description of the function of each block in accordance with one or more embodiments is provided below. Note that the typical color image sensor (e.g., CMOS or CCD) includes a rectangular array of photosites (i.e., pixels) with each photosite covered by a filter (the CFA): typically, red, green, or blue. In the commonly-used Bayer pattern CFA, one-half of the photosites are green, one-quarter are red, and one-quarter are blue.

To optimize the dynamic range of the pixel values represented by the imager of the digital camera, the pixels representing black need to be corrected since the imager still records some non-zero current at these pixel locations. The black clamp function adjusts for this difference by subtracting an offset from each pixel value, but clamping/clipping to zero to avoid a negative result.

Imperfections in the digital camera lens introduce nonlinearities in the brightness of the image. These nonlinearities reduce the brightness from the center of the image to the border of the image. The lens distortion compensation function compensates for the lens by adjusting the brightness of each pixel depending on its spatial location.

Photosite arrays having large numbers of pixels may have defective pixels. The fault pixel correction function interpolates the missing pixels with an interpolation scheme to provide the rest of the image processing data values at each pixel location.

The illumination during the recording of a scene is different from the illumination when viewing a picture. This results in a different color appearance that is typically seen as the bluish appearance of a face or the reddish appearance of the sky. Also, the sensitivity of each color channel varies such that grey or neutral colors are not represented correctly. The white balance function compensates for these imbalances in colors by computing the average brightness of each color component and by determining a scaling factor for each color component. Since the illuminants are unknown, a frequently used technique just balances the energy of the three colors. This equal energy approach requires an estimate of the unbalance between the color components.

Due to the nature of a color filter array, at any given pixel location, there is only information regarding one color (R, G, or B in the case of a Bayer pattern). However, the image pipeline needs full color resolution (R, G, and B) at each pixel in the image. The CFA color interpolation function reconstructs the two missing pixel colors by interpolating the neighboring pixels.

Display devices used for image-viewing and printers used for image hardcopy have a nonlinear mapping between the image gray value and the actual displayed pixel intensities. The gamma correction function (also referred to as adaptive gamma correction, tone correction, tone adjustment, contrast/brightness correction, etc.) compensates for the differences between the images generated by the image sensor and the image displayed on a monitor or printed into a page.

Typical image-compression algorithms such as JPEG operate on the YCbCr color space. The color space conversion function transforms the image from an RGB color space to a YCbCr color space. This conversion may be a linear transformation of each Y, Cb, and Cr value as a weighted sum of the R, G, and B values at that pixel location.

The nature of CFA interpolation filters introduces a low-pass filter that smoothes the edges in the image. To sharpen the images, the edge detection function computes the edge magnitude in the Y channel at each pixel. The edge magnitude is then scaled and added to the original luminance (Y) image to enhance the sharpness of the image.

Edge enhancement is performed in the Y channel of the image. This leads to misalignment in the color channels at the edges, resulting in rainbow-like artifacts. The false color suppression function suppresses the color components, Cb and Cr, at the edges reduces these artifacts.

The autofocus function automatically adjusts the lens focus in a digital camera through image processing. These autofocus mechanisms operate in a feedback loop. They perform image processing to detect the quality of lens focus and move the lens motor iteratively until the image comes sharply into focus.

Due to varying scene brightness, to get a good overall image quality, it is necessary to control the exposure of the image sensor. The autoexposure function senses the average scene brightness and appropriately adjusting the image sensor exposure time and/or gain. Similar to autofocus, this operation is also in a closed-loop feedback fashion.

Most digital cameras are limited in the amount of memory available on the camera; hence, the image compression function is employed to reduce the memory requirements of captured images and to reduce transfer time.

A method for image noise filtering in the Bayer domain as described herein may be performed at various points in the image pipeline, e.g., after any one of the following: analog processing and A/D, optical black clamp, lens distortion compensation, or fault pixel correction.

Figure 3:
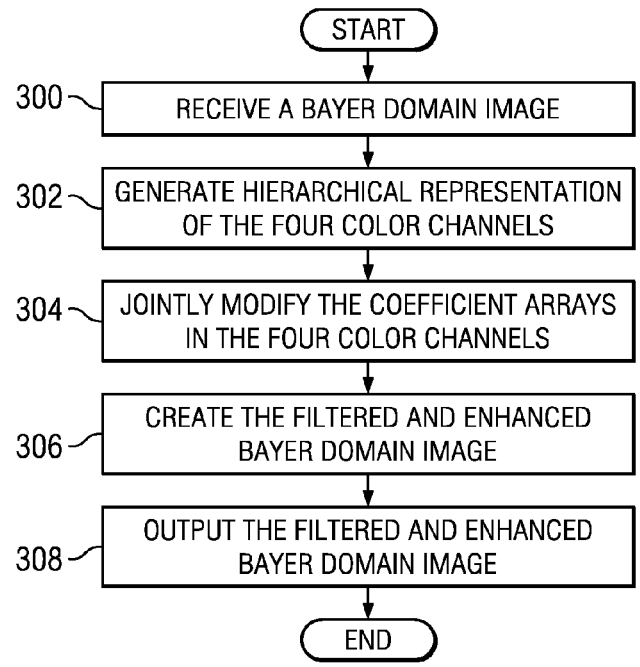
FIG. 3 is a flow diagram of a method.

FIG. 3 is a flow graph of a method for joint color channel image noise filtering and edge enhancement in the Bayer domain. In general, the method applies a novel undecimated Haar wavelet filter to a Bayer domain digital image to perform the joint color channel noise filtering and edge enhancement. Initially, a Bayer domain digital image with four color channels denoted as R, Gr, Gb, and B is received 300. A hierarchical representation of the four color channels is then generated 302. That is, each of the four color channels is decomposed by application of a wavelet transform. To generate the hierarchical representation, first an h×v-level (horizontally h-level, vertically v-level) hierarchical representation of each color channel is created by successive high-pass and low-pass filtering. Without loss of generality, assume h≧v. The representation will be a set of coefficient arrays at each level. Different values of h and v can be used to create the filter F with different sizes for different system complexity constraints. The horizontal size of the filter F will be 2^(h+1)−1 and the vertical size will be 2^(v+1)−1. For example, if h and v are both 3, the size of the filter F is 15×15. If h=3 and v=2, the size of the filter F is 15×7. If h=3 and v=1, the size of filter F is 15×3. The number of levels may be determined by a user. The tradeoff in selecting the number of levels may be the amount of noise reduction versus complexity. That is, higher numbers of levels will provide better noise reduction at the cost of increased complexity.

Each level of the hierarchical representation is created as follows. For the k-th level, the high-pass filter $f_H$ and low pass-filter $f_L$ are:

$$f_L=[1/2\ (2^{(k-1)}-1)\text{zeros}\ 1/2]$$

$$f_H=[1/2\ (2^{(k-1)}-1)\text{zeros}\ -1/2].$$

For example, if k=1, $f_L$=[1/2 1/2], $f_H$=[1/2 −1/2]. If k=2, $f_L$=[1/2 0 1/2], $f_H$=[1/2 0 −1/2]. If k=3, $f_L$=[1/2 0 0 0 1/2], $f_H$=[1/2 0 0 0 −1/2].

For color channel Gr, let Gr(1, x, y)=Gr(x,y). For each level k, 1≦k≦v, in ascending order, the high-pass and low-pass filters are applied as follows:

Filter Gr(k,x,y) vertically by $f_L$ to create temp1(x,y);
Filter Gr(k,x,y) vertically by $f_H$ to create temp2(x,y);
Filter temp1(x,y) horizontally by $f_L$ to create Gr(k+1,x,y);
Filter temp1(x,y) horizontally by $f_H$ to create C_Gr(1,k,x,y);
Filter temp2(x,y) horizontally by $f_L$ to create C_Gr(2,k,x,y);
Filter temp2(x,y) horizontally by $f_H$ to create C_Gr(3,k,x,y).

For each level k, v+1≦k≦h, in ascending order, the high-pass and low-pass filters are applied as follows:

Filter Gr(k,x,y) horizontally by $f_L$ to create Gr(k+1,x,y);
Filter Gr(k,x,y) horizontally by $f_H$ to create C_Gr(1,k,x,y).

The coefficient arrays for the other three color channels R, B, and Gb are similarly created. In C_Gr(1,k,x,y), C_Gr(2,k,x,y), and C_Gr(3,k,x,y), the numbers refer to different bands of coefficients.

Referring again to FIG. 3, after the hierarchical representation is generated, the coefficient arrays of the four color channels are jointly modified 304 to remove the high frequency part of the coefficient arrays to reduce noise in the image. The joint modification is performed as follows. Joint luminance coefficient arrays are computed at each level k in the hierarchy. At each level k in the hierarchical representation, there are coefficient arrays for each of the four color channels: C_Gr(n,k,x,y), C_R(n,k,x,y), C_B(n,k,x,y), C_Gb(n,k,x,y). The joint luminance coefficient arrays of level k and coefficient band n are computed as the average of the coefficient arrays of the color channels:

$$C(n,k,x,y)=(C\_Gr(n,k,x,y)+C\_R(n,k,x,y)+C\_B(n,k,x,y)+C\_Gb(n,k,x,y))/4$$

for every n and k≦h.

Adaptive noise thresholds T(n,k,x,y) are also computed for each coefficient in the luminance coefficient arrays at each level k. The computation of the adaptive noise thresholds is based on a brightness array I(n,x,y) for each channel that is computed as $$I(n,x,y)=(Gr(h+1,x,y)+R(h+1,x,y)+B(h+1,x,y)+Gb(h+1,x,y))/4.$$

Note that I(n,x,y) is the average of the lowest frequency coefficients. For each level k, 1≦k≦h, and band n, the noise threshold array T(n,k,x,y) is computed as:

$$T(n,k,x,y)=\text{offset}(n,k)+\text{slope}(n,k)*I(n,x,y)$$

where offset(n,k) and slope(n,k) are empirically determined input parameters. T(n,k,x,y) may also be defined as other functions of I(n,x,y) such as, for example, piecewise linear functions.

Figure 4A:
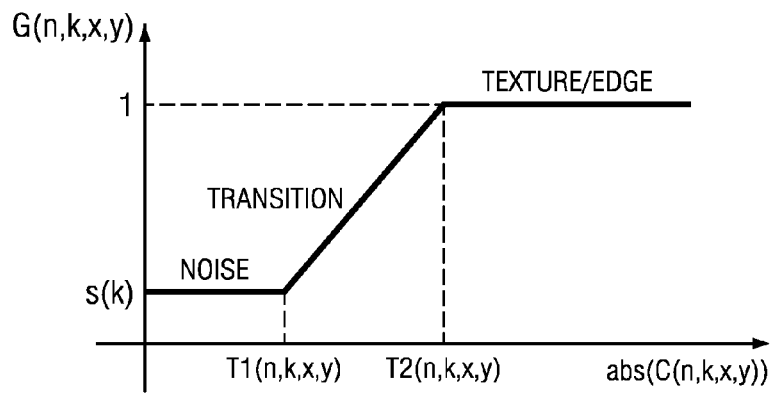
FIGS. 4A and 4B are graphs.
Figure 4B:
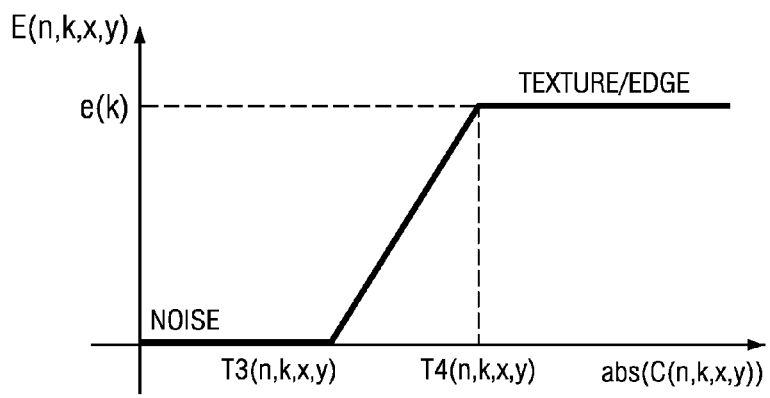

For each luminance coefficient in a joint luminance coefficient array C(n,k,x,y), a corresponding gain value G(n,k,x,y) and a corresponding edge enhancement value E(n,k,x,y) are calculated as illustrated in the pseudo code of Table 1. FIG. 4A is a graph illustrating the relationship of the gain value G(n,k,x,y) and the luminance coefficient C(n,k,x,y) and FIG. 4B is a graph illustrating the relationship of the edge enhancement value E(n,k,x,y) and the luminance coefficient C(n,k,x,y). In the pseudo code of Table 1, s(k) and e(k) are empirically determined respective strengths of the noise filter and the edge enhancement for a level k. The thresholds are defined as $$T1(n,k,x,y)=t1*T(n,k,x,y)$$

$$T2(n,k,x,y)=t2*T(n,k,x,y)$$

$$T3(n,k,x,y)=t3*T(n,k,x,y)$$

$$T4(n,k,x,y)=t4*T(n,k,x,y)$$

where t1, t2, t3, and t4 are empirically determined.

TABLE 1

```
if abs(C(n,k,x,y)) ≤ T1(n,k,x,y)
    G(n,k,x,y) = s(k)
else if T1(n,k,x,y) < abs(C(n,k,x,y)) < T2(n,k,x,y)
    G(n,k,x,y)=s(k)+(abs(C(n,k,x,y))−T1(n,k,x,y))*(1−s(k))/
        (T2(n,k,x,y)−T1(n,k,x,y))
else if abs(C(n,k,x,y)) ≥ T2(n,k,x,y)
    G(n,k,x,y) = 1
end if
if abs(C(n,k,x,y)) ≤ T3(n,k,x,y)
    E(n,k,x,y) = 0
else if T3(n,k,x,y) < abs(C(n,k,x,y)) < T4(n,k,x,y)
    E(n,k,x,y) = (abs(C(n,k,x,y)) − T3(n,k,x,y))*e(k) /
        (T4(n,k,x,y) − T3(n,k,x,y))
else if abs(C(n,k,x,y)) ≥ T4(n,k,x,y)
    E(n,k,x,y) = e(k)
end if
```

Modified coefficient arrays for each color channel at each level k and band n are then computed as:

$$C'\_Gr(n,k,x,y)=C\_Gr(n,k,x,y)*G(n,k,x,y)+E(n,k,x,y)*sign(G\_Cr(n,k,x,y));$$

$$C'\_R(n,k,x,y)=C\_R(n,k,x,y)*G(n,k,x,y)+E(n,k,x,y)*sign(C\_R(n,k,x,y));$$

$$C'\_B(n,k,x,y)=C\_B(n,k,x,y)*G(n,k,x,y)+E(n,k,x,y)*sign(C\_B(n,k,x,y));$$

$$C'\_Gb(n,k,x,y)=C\_Gb(n,k,x,y)*G(n,k,x,y)+E(n,k,x,y)*sign(G\_Cb(n,k,x,y))$$

where n ranges from 1 to 3 for $1 \leq k \leq v$, and n=1 for $v+1 \leq k \leq h$, and k ranges from 1 to h.

Referring again to FIG. 3, the filtered and enhanced image is created using the modified coefficient arrays 306 and is output for further processing 308. The filtered and enhanced image is created as follows. For color channel Gr, starting for level k from h to v+1 in the descending order, apply a high pass and a low pass filter in the following way:

Filter $Gr_{k+1}(x,y)$ horizontally by $f_L$ to create temp1(x,y)
Filter C'_Gr(1,k,x,y) horizontally by $f_H$ to create temp2(x,y)
Gr'(k,x,y)=temp1(x,y)+temp2(x,y).

where, for the k-th level, the high-pass filter and low pass-filter are:

$$f_L=[1/2 (2^{(k-1)}-1)\text{zeros } 1/2],$$

$$f_H=[-1/2 (2^{(k-1)}-1)\text{zeros } 1/2].$$

For example, if k=1, $f_L$=[1/2 1/2], $f_H$=[−1/2 1/2]. If k=2, $f_L$=[1/2 0 1/2], $f_H$=[−1/2 0 1/2]. If k=3 $f_L$=[1/2 0 0 0 1/2], $f_H$=[−1/2 0 0 0 1/2].

Then, for level k from v to 1 in the descending order, apply the filters as follows:

Filter Gr(k+1,x,y) horizontally by $f_L$ to create temp1(x,y).
Filter C'_Gr(1,k,x,y) horizontally by $f_H$ to create temp2(x,y).
Filter C'_Gr(2,k,x,y) horizontally by $f_L$ to create temp3(x,y).
Filter C'_Gr(3,k,x,y) horizontally by $f_H$ to create temp4(x,y).
Filter temp1(x,y)+temp2(x,y) vertically by $f_L$ to create temp5(x,y)
Filter temp3(x,y)+temp4(x,y) vertically by $f_H$ to create temp6(x,y)
Gr'(k,x,y)=temp5(x,y)+temp6(x,y).

The filtered and enhanced image of color channel Or will be Gr'(x,y)=Gr'(1,x,y). The filtered and enhanced images R'(x,y), B'(x,y), and Gb'(x,y) for the other three color channels R, B, and Gb are similarly created. Thus, {Gr'(x,y), R'(x,y), B'(x,y), Gb'(x,y)} is the filtered and enhanced Bayer image.

Other Embodiments

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

While the invention has been described with respect to a limited number of embodiments, those skilled in the art, having benefit of this disclosure, will appreciate that other embodiments can be devised which do not depart from the scope of the invention as disclosed herein. It is therefore contemplated that the appended claims will cover any such modifications of the embodiments as fall within the true scope of the invention.

What is claimed is:

1. A method of image noise filtering comprising:
receiving a Bayer domain image with four color channels;
generating a hierarchical representation of the four color channels comprising a set of coefficient arrays at each level of the hierarchical representation;
modifying the coefficient arrays of the color channels jointly to remove noise; and
generating a noise filtered and edge enhanced Bayer domain image based on the jointly modified coefficient arrays;
wherein modifying the coefficient arrays further comprises:
computing joint luminance coefficient arrays at each level in the hierarchy; and
computing adaptive noise thresholds for each coefficient in the joint luminance coefficient arrays at each level.

2. The method of claim 1, wherein computing adaptive noise thresholds comprises using a brightness array for each channel, wherein the brightness array is an average of lowest frequency coefficients.

3. The method of claim 1, wherein a noise threshold array T(n,k,x,y) is computed as T(n,k,x,y)=offset(n,k)+slope(n,k)*I(n,x,y), wherein n is a band of coefficients, k is a level in the hierarchical representation, x and y are pixel coordinates, and offset(n,k) and slope(n,k) are empirically determined.

4. The method of claim 1, wherein computing joint luminance coefficient arrays further comprises computing a joint luminance coefficient array as an average of the coefficient arrays of the color channels.

5. The method of claim 4, wherein a joint luminance coefficient array C(n,k,x,y) is computed as C(n,k,x,y)=(C_Gr(n,k,x,y)+C_Gr (n,k,x,y)+C_B(n,k,x,y)+C_Gb(n,k,x,y))/4, wherein n is a band of coefficients, k is a level in the hierarchical representation, x and y are pixel coordinates, and C_Gr, C_Gr, C_B, and C_Gb are coefficient arrays of color channels.

6. The method of claim 1, further comprising computing a gain value array and an edge enhancement value array for each joint luminance coefficient array.

7. The method of claim 6, further comprising computing modified coefficient arrays for each color channel based on the gain value arrays and edge value arrays.

8. The method of claim 7, wherein generating a noise filtered and edge enhanced Bayer domain image further comprises using the modified coefficient arrays to generate the noise filtered and edge enhanced Bayer domain image.

9. The method of claim 8, further comprising applying a high pass and a low pass filter to each color channel.

10. An apparatus comprising:
means for receiving a Bayer domain image with four color channels;
means for generating a hierarchical representation of the four color channels comprising a set of coefficient arrays at each level of the hierarchical representation;
means for modifying the coefficient arrays of the color channels jointly to remove noise; and
means for generating a noise filtered and edge enhanced Bayer domain image based on the jointly modified coefficient arrays
wherein the means for modifying the coefficient arrays further comprises:
means for computing joint luminance coefficient arrays at each level in the hierarchy; and
means for computing adaptive noise thresholds for each coefficient in the joint luminance coefficient arrays at each level.

11. The apparatus of claim 10, wherein the means for computing adaptive noise thresholds comprises means for using a brightness array for each channel, wherein the brightness array is an average of lowest frequency coefficients.

12. The apparatus of claim 11, wherein a noise threshold array $T(n,k,x,y)$ is computed as $T(n,k,x,y)=\text{offset}(n,k)+\text{slope}(n,k)*I(n,x,y)$, wherein n is a band of coefficients, k is a level in the hierarchical representation, x and y are pixel coordinates, and $\text{offset}(n,k)$ and $\text{slope}(n,k)$ are empirically determined.

13. The apparatus of claim 10, wherein the means for computing joint luminance coefficient arrays further comprises means for computing a joint luminance coefficient array as an average of the coefficient arrays of the color channels.

14. The apparatus of claim 13, wherein a joint luminance coefficient array $C(n,k,x,y)$ is computed as $C(n,k,x,y)=(C\_Gr(n,k,x,y)+C\_Gr(n,k,x,y)+C\_B(n,k,x,y)+C\_Gb(n,k,x,y))/4$, wherein n is a band of coefficients, k is a level in the hierarchical representation, x and y are pixel coordinates, and C_Gr, C_Gr, C_B, and C_Gb are coefficient arrays of color channels.

15. The apparatus of claim 10, further comprising means for computing a gain value array and an edge enhancement value array for each joint luminance coefficient array.

16. The apparatus of claim 15, further comprising means for computing modified coefficient arrays for each color channel based on the gain value arrays and edge value arrays.

17. The apparatus of claim 16, wherein the means for generating a noise filtered and edge enhanced Bayer domain image further comprises means for using the modified coefficient arrays to generate the noise filtered and edge enhanced Bayer domain image.

18. The apparatus of claim 17, further comprising means for applying a high pass and a low pass filter to each color channel.

* * * * *